March 8, 1932.  F. S. CRISPIN  1,848,826
STORAGE BATTERY
Filed Feb. 10, 1927
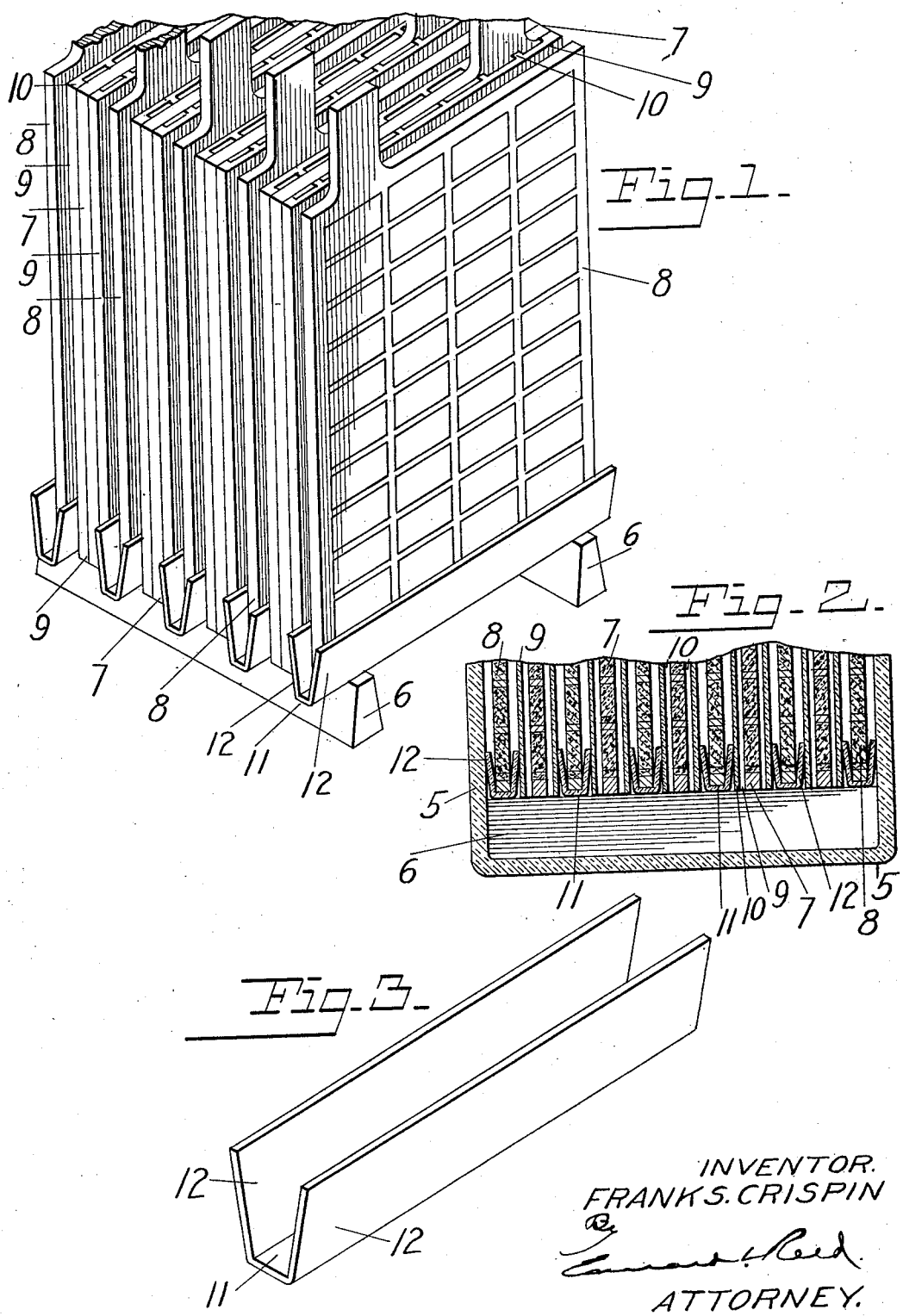
INVENTOR.
FRANK S. CRISPIN
ATTORNEY.

Patented Mar. 8, 1932

1,848,826

UNITED STATES PATENT OFFICE

FRANK S. CRISPIN, OF DAYTON, OHIO

STORAGE BATTERY

Application filed February 10, 1927. Serial No. 167,115.

This invention relates to storage batteries and more particularly to a protector for the negative plates of a storage battery. In the ordinary storage battery the plates, and more particularly the positive plates, slowly disintegrate and the material thereof is separated from or shed by the outer surfaces thereof in the form of a fine sediment, which settles to the bottom of the cell. This sediment or material which is shed by the plates gradually accumulates in the bottom of the cell in considerable quantities and in the course of time may accumulate in such a quantity as to contact with both the positive plate and the negative plate and inasmuch as the material is of a highly conductive character such contact would result in the short circuiting of the plates. While the negative plate sheds its material much more slowly than does the positive plate the material shed by the negative plate will nevertheless accumulate directly beneath the same and thus tend to build up an accumulation of material until it contacts with the negative plate.

One object of the present invention is to provide a negative plate with a protector which will prevent the accumulation of material in the bottom of the cell from contacting with the negative plate and which will also intercept the material shed by the negative plate and thus prevent the same from being added to the accumulation from the positive plates.

A further object of the invention is to provide such a protector which will exert pressure on the separators on the opposite sides of the negative plate to maintain a tight joint between the protector and the separators.

A further object of the invention is to provide such a protector which will be very simple in its construction and which can be produced and installed at a very low cost.

Other objects of the invention will appear as the device is described in detail.

In the accompanying drawings Fig. 1 is a perspective view of the plate assembly in an ordinary storage battery, partly broken away; Fig. 2 is a section of the lower portion of a storage battery cell taken transversely to the plates; and Fig. 3 is a perspective detail view of one of the protectors.

In these drawings I have illustrated one embodiment of my invention and have shown the same as applied to the negative plates of a storage battery of ordinary construction but it will be understood that this embodiment has been chosen for the purpose of illustration, that the protector may take various forms and that it may be utilized with storage batteries of various kinds.

The storage battery here illustrated comprises the usual outer casing or cell 5 in the bottom of which are arranged a pair of longitudinally extending strips or bridges 6 upon which rest the lower edges of the plates. The positive plates 7 and the negative plates 8 are arranged alternately and are separated one from the other by separators or plates of insulating material 9. Usually the separator is provided on that surface adjacent to the positive plate, with vertical ribs 10 which contact with the positive plate, and with a flat surface adjacent to the negative plate.

To prevent the accumulation of material in the bottom of the cell from coming in contact with the lower edges of the negative plates I have provided each of these plates with a protector 11 which is preferably trough-shaped and has its side walls 12 diverging upwardly. The bottom of the channel like protector is adapted to receive and support the lower edge of the negative plate and the side walls extend upwardly between the negative plate and the respective separators 9 so as to enclose the lower edges of the plate. The side walls of the protector are so arranged that they will completely close the space between the negative plate and the adjacent separators and will have their upper edges spaced a slight distance from the respective surfaces of the negative plate, so that the protector will constitute a receptacle to receive the material which is shed by the negative plate and prevent the same from being deposited in the bottom of the cell along with the accumulations from the positive plates. Preferably the protector is formed from thin insulating material of a resilient character, such as hard or semi-hard rubber and the diverging upper walls thereof, when confined between the separators and the negative plate, will exert outward pressure on the separators to hold the same against the positive plates and to effectively close the space between the negative plate and the separators and to provide the desired clearance between the upper edges of the side walls of the separator and the adjacent surfaces of the negative plate. In the present drawings the thickness of the protector and the spacing between the walls thereof and the surfaces of the negative plate and between the negative plate and the separators, is exaggerated, to facilitate the illustration, and in practice the material of the plate will be quite thin and the clearance between the several parts correspondingly smaller. However, it will be understood that the thickness of the material and the spacing of the several plates may vary in different installations.

It will be apparent that the protector is of such a character that it may be produced at a very low cost and that it may be very quickly and easily applied to one of the negative plates of the battery without any change whatever in the construction of the plate or of the other parts of the battery. When the several negative plates are provided with these protectors it will be obvious that the accumulation of active materal in the bottom of the cell cannot contact with he lower edges of these plates. Even should this accumulation extend for a considerable distance above the bridges 6 it cannot pass the upper edges of the protectors, which are in contact with the separators. Further, the upper edges of the protectors being spaced a slight distance from the adjacent surfaces of the respective negative plates any material shed by the negative plates will enter the protectors and be retained therein.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a storage battery comprising positive and negative plates and separators between the plates, a channel shaped protector to receive the lower edge of one of said plates, the side walls of said protector extending between said plate and the adjacent separators and having their upper edges spaced from the respective surfaces of said plate.

2. In a storage battery comprising positive and negative plates and separators between the plates, a channel shaped protector to receive the lower edge of one of said negative plates, the side walls of said protector diverging upwardly and having their upper edges spaced from the respective surfaces of said negative plate and engaging the respective separators.

3. In a storage battery comprising positive and negative plates and separators between said plates, a channel shaped protector of resilient material having outwardly diverging side walls to receive between them the lower edge of one of said negative plates.

In testimony whereof, I affix my signature hereto.

FRANK S. CRISPIN.